United States Patent

[11] 3,580,348

| [72] | Inventor | Rosario Di Blasi<br>Via G. Tell 2, Francofonte, Siracusa, Italy |
|---|---|---|
| [21] | Appl. No. | 813,866 |
| [22] | Filed | Apr. 7, 1969 |
| [45] | Patented | May 25, 1971 |
| [32] | Priority | Apr. 18, 1968 |
| [33] | | Italy |
| [31] | | 15420A68 |

[54] WHEEL COLLAPSIBLE FRAME
5 Claims, 9 Drawing Figs.

[52] U.S. Cl. .................................................. 180/25, 280/41, 280/278
[51] Int. Cl. .................................................. B62k 15/00
[50] Field of Search ........................................ 280/36, 37, 38, 41, 278, 287; 180/25 (A)

[56] References Cited
UNITED STATES PATENTS

| 2,812,188 | 11/1957 | Rusch | 280/41 |
|---|---|---|---|
| 2,812,949 | 11/1957 | Munro | 280/41 |
| 3,004,619 | 10/1961 | Straussler | 280/36X |
| 3,079,172 | 2/1963 | Burwell | 280/278 |
| 3,329,228 | 7/1967 | Harris | 280/278X |
| 3,369,629 | 2/1968 | Weiss | 180/25 (A)UX |
| 3,443,823 | 5/1969 | Perego | 280/36 |

*Primary Examiner*—Benjamin Hersh
*Assistant Examiner*—Leslie J. Paperner
*Attorney*—Steinberg & Blake

ABSTRACT: Collapsible frame for wheeled vehicles, comprising a main structure to which rear forks are pivoted and carry wheels, a front footboard carrying a steering wheel, and a seat.

Said forks, footboard and seat are clampable to an open position where the frame is at running conditions and are operable to assume a closed position where the forks and footboard enter the main structure on which the seat can be overturned, in this case the frame occupying a rather reduced volume or space.

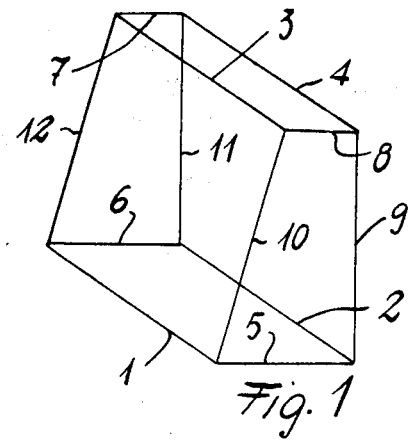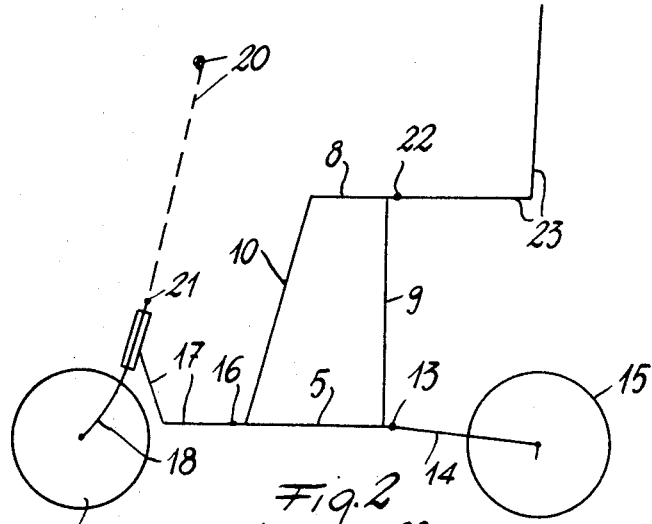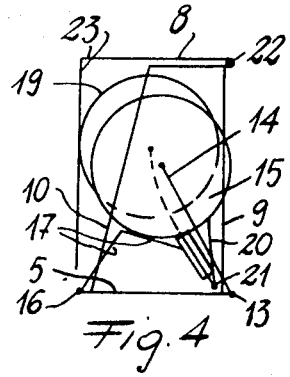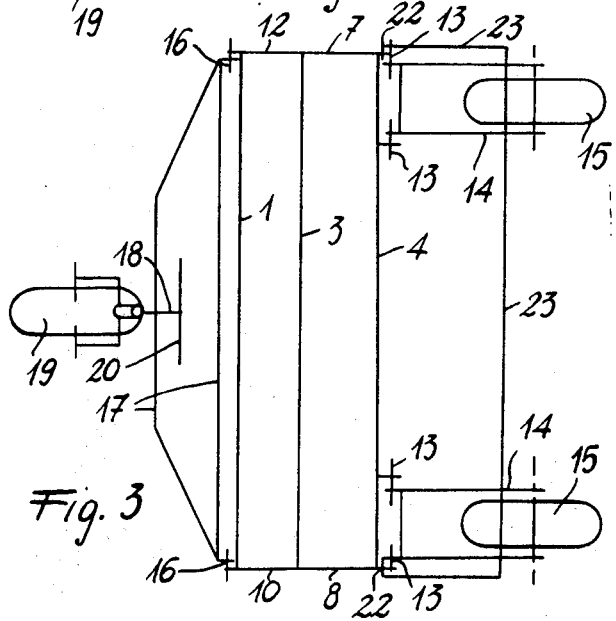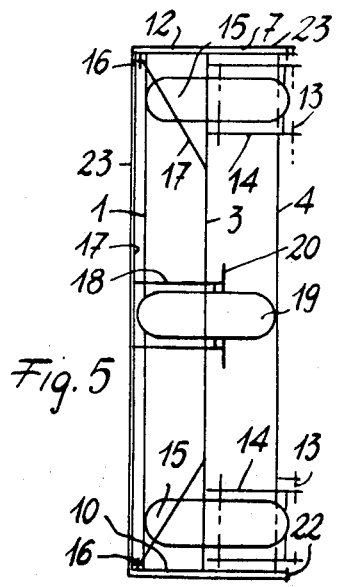

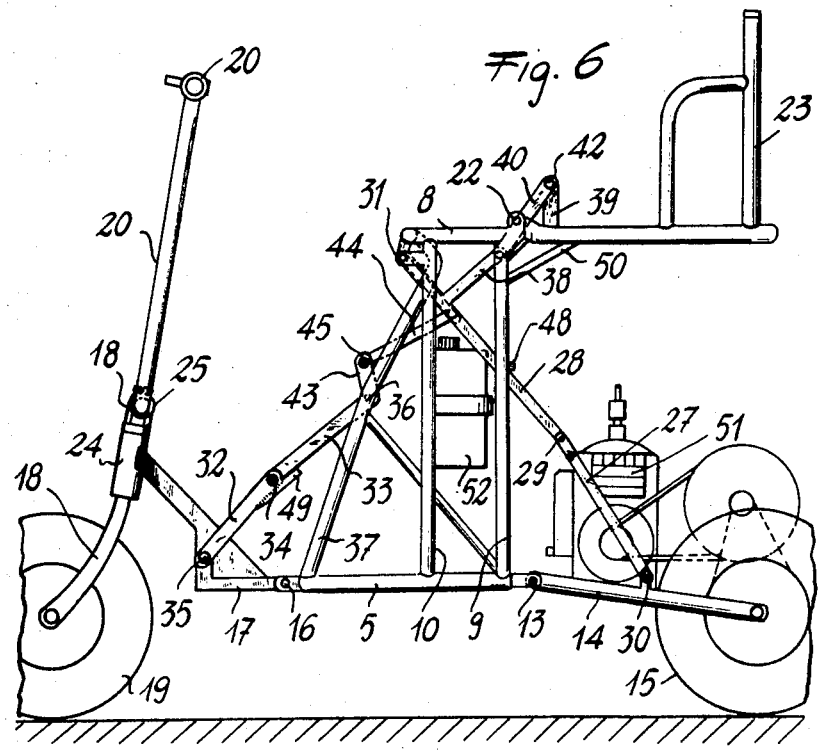
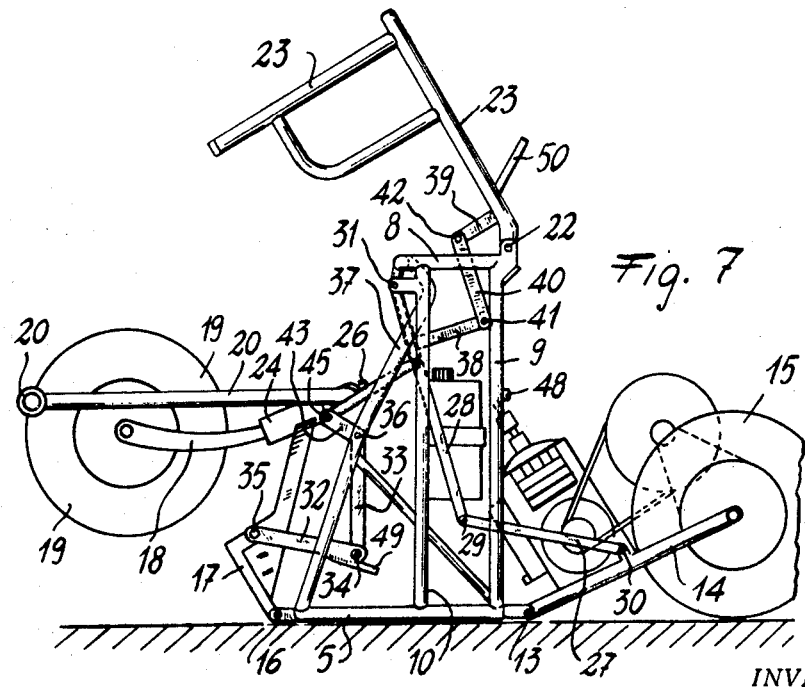

INVENTOR.
ROSARIO DI BLASI
BY Stemberg & Blake
attys

WHEEL COLLAPSIBLE FRAME

This invention relates to a collapsible frame for a wheeled vehicle, and more particularly a vehicle as mounted on at least three wheels, at least one of which being a steering wheel.

Many types of collapsible frames for wheeled vehicles are known, such frames comprising a plurality of frame portions interconnected by screws allowing the frame disassembly into a plurality of portions or elements so as to reduce the overall sizes thereof when the frame is not in use.

A disadvantage of the prior frames is that the structure thereof is somewhat complicated and particularly in that to cause the frame to assume the vehicle running attitude from the position at which said frame is dismantled or collapsed, or vice versa, somewhat troublesome and time-consuming operations are required.

It is an object of the present invention to provide a collapsible frame for a wheeled vehicle, having a somewhat simple and low-cost structure and comprising frame portions capable of assuming a somewhat compact enclosed configuration and being operated to assume an open configuration, i.e. the vehicle running configuration, and vice versa, by ver simple and ready operations.

A further object is to provide a collapsible frame tending, when open at vehicle running attitude, to retain this configuration independently of the load applied to the vehicle and unevenness of the ground or road on which the vehicle is running, no clamping means being required for assuring that the attained attitude will be retained.

A still further object is to provide a collapsible frame for a vehicle, capable of easily accommodating and transporting two or more passengers and which can be folded or collapsed to assume such an overall volume that said frame can readily be accommodated within a normal car trunk.

These and still further objects are attained by a collapsible frame for a wheeled vehicle, characterized by comprising a main tubular structure, a pair of forks which at one end thereof are pivoted to the rear lower side of said tubular structure and each carrying at the other end thereof at least one wheel, a rigid footboard pivoted to the front lower side of the tubular structure and on which at least one rod is mounted, at the running conditions for the vehicle such a rod being rotatable about a substantially vertical axis and carrying at an end thereof one vehicle wheel, said rod being provided with means operable to control the rotation thereof about said substantially vertical axis, the frame also comprising a secondary tubular structure pivoted to the upper side of said main tubular structure and forming the rigid portion of a seat, said pair of forks and said footboard, along with the wheels carried thereby, being rotatable on respective pins restraining them to the main tubular structure between a closed position, at which they are collapsed within the main tubular structure, and an open position, at which they project from said tubular structure with the wheels supporting the vehicle at running conditions, said secondary tubular structure being rotatable on its pin between a closed position, at which it is overturned on the main tubular structure, and an open position, at which it extends at the rear of the main tubular structure, means being provided for clamping at least said pair of forks and said footboard at said open position.

In order that the structure and features of this frame be more clearly understood, an embodiment thereof will now be described by mere way of example and not of limitation, reference being made to the accompanying drawings, in which:

FIGS. 1—5 are fully schematical views showing the collapsible frame;

FIG. 6 is a side elevational view for an embodiment of the collapsible frame at open condition, that is at the running conditions of the vehicle said frame is a part of;

FIG. 7 is a side elevational view of the frame in FIG. 6, at the conditions said frame is when being collapsed from open to closed positions;

Figure 8:
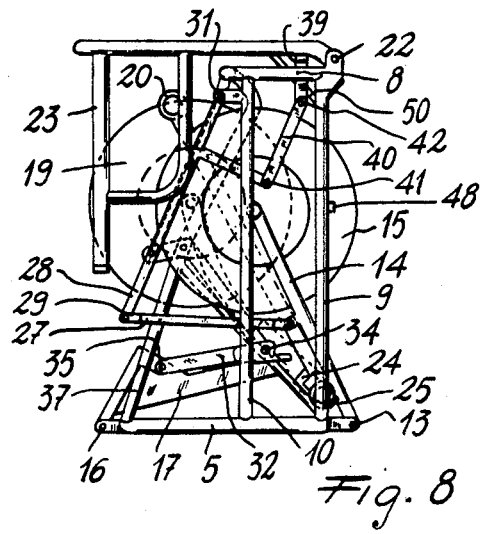
FIG. 8 is a still side elevational view of the frame in FIGS. 6 and 7, as shown at collapsed closed position.
Figure 9:
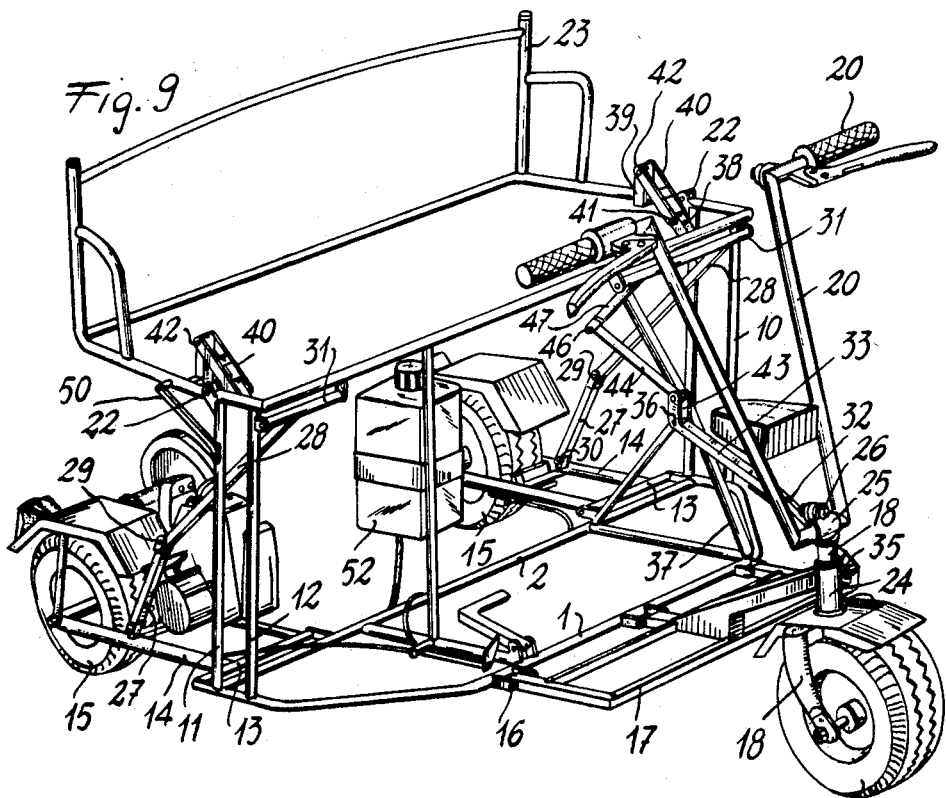
FIG. 9 is a perspective view of the frame at open position, as completed with several fittings forming part of the vehicle.

Referring first to FIGS. 1—5, wherein, as above mentioned, a fully diagrammatic embodiment of the collapsible frame is shown.

This frame comprises a main tubular structure which in FIG. 1 has been shown in a perspective view and separated from the remaining members of the frame. This main tubular structure is comprised of a front bottom tube section 1, a rear bottom tube section 2, two top tube sections 3 and 4, respectively, and other tube sections as designated by reference numerals 5 to 12 included.

Particular reference is now made to FIGS. 2 and 3, wherein with the above-described main tubular structure are fast the other basic members forming the collapsible frame which in these two figures is shown at open position, or at the conditions in which the frame comprising vehicle is at running attitude, the frame being shown at running position in FIG. 2 and in a plan view in FIG. 3. An end of a pair of forks 14, each carrying at the other end thereof a wheel 15, is pivoted to the rear bottom side of the main tubular structure, more particularly to the tube section 2.

A rigid footboard 17 is pivoted on pins 16 to the front bottom side of the tubular structure, more particularly to the tube section 1, a rod 18 being mounted on said footboard and rotatable under the vehicle running conditions about a substantially vertical axis and having at one end thereof a vehicle wheel 19, a handle 20 being fast with said rod 18 and secured thereto by a screw 21 about which, when said screw is loosened, said handle and rod may rotate relative to each other.

A secondary tubular structure 23, for the sake of brevity hereinafter merely referred to as a seat, is pivoted on pins 22 to the top side of the main tubular structure, and more particularly to the tube section 4, said secondary tubular structure forming the rigid portion for a seat on which the vehicle passengers can sit down.

The several members comprising the frame, as described, can be clamped by means, to be described in detail below, to an open position wherein the forks 14, footboard 17 and seat 23 are projecting from the main tubular structure and the wheels 15 and 19 support the vehicle at running position, as shown in FIGS. 2 and 3. The pair of forks and footboard with the wheels supported thereby can be rotated on respective pins 13 and 16 to be moved from the open position as above to a closed position wherein they are bent over or collapsed within the main tubular structure, that is at the position as shown in side elevational view in FIG. 4 and in plan view in FIG. 5, after loosening screw 21 and bending over or collapsing handle 21 on rod 18. The seat is also rotatable on pins 22 and can be easily and readily moved from the open position, as shown in FIGS. 2 and 3 wherein it extends rearwardly of the main tubular structure, to a closed position wherein said seat is overturned on said main tubular structure, as seen in FIGS. 4 and 5. It may be readily understood that the frame, when collapsed as shown in FIGS. 4 and 5, assumes a somewhat reduced overall volume as compared with that at running conditions.

Reference is now made to FIGS. 6—9, wherein a detailed view of an embodiment for the collapsible frame is shown, for the sake of clarity using in these figures the same reference numerals as used in FIGS. 1—5.

In the frame embodiment of FIGS. 6—9, the rod 18 is accommodated and rotatable within a sleeve 24 fast with the footboard 17, whereas the LP handle 20 is held in a clamp 25, on which it is locked or rotatable depending on whether a screw 26, closing the clamp, is tightened or loosened.

Each fork of the pair of forks 14 of the frame is coupled to the main tubular structure by first and second levers, such as 27 and 28 respectively, at one end thereof said levers being pivoted to each other at a pin 29 and with the other end of the first lever 27 pivoted to fork 14 at a pin 30 and the other end of the second lever 28 pivoted to the main tubular structure at a pin 31.

The footboard 17 is connected to the main tubular structure by a first lever 32 and a second lever 33 which at one end thereof are pivoted to each other at a pin 34 and with the other end of the first lever 32 pivoted to the footboard at a pin 35 and the other end of the second lever 33 pivoted to the main tubular structure at a pin 36 fast with a tube section 37 forming part of the main tubular structure.

As clearly seen from the figures, the second lever 28 for each fork is connected to seat 23 by motion-transmitting means comprising a rod 38 fast with lever 28, a rod 39 fast with seat 23, and a lever 40 connected to rods 38 and 39 by two pins 41 and 42, respectively. Lever 33, connecting the main tubular structure to the footboard, is connected in turn to the seat by a lever 43 fast with lever 33 and forming an angle therewith, and by a lever 44, an end of which is pivotally connected to the free end of lever 43 by a pin 45, and the other end of which is connected by a pin 46 to a rod 47 (FIG. 9) fast with pin 31, the top end of one of said two levers 28 being fast therewith, said pin 31 being rotatable on support members carried on the main tubular structure.

Thus, it is apparent that the seat, footboard and forks 14 are pivotally connected to one another and when the seat is at open position (FIGS. 6 and 9), the footboard and forks will also be at open position, while the rotation of the seat from open to closed position causes the rotation from open to closed position also for footboard 17 and forks 14, as readily seen from FIG. 7, where the frame is shown as partially closed, and from FIG. 8, where the frame is shown as fully closed: it is to be understood that prior to moving the frame from open to close position, it is required to loosen said screw 26 and to rotate said handle 20 on clamp 25 so as to overturn it on wheel 19, as clearly shown in FIG. 7.

It is also apparent that should the seat 23 be moved from the closed position in FIG. 8, where said seat overlaps the main tubular structure, to the open position in FIG. 6, the footboard 17 and forks 14 would project from the main tubular structure and be moved as well to the position in FIG. 6. These frame opening and closing operations, as effected by only operating on seat 23, are extremely simple and fast to be accomplished where the kinematic means for connecting the seat with the footboard and forks 14 are made in proper sizes, as in the frames I manufactured.

As particularly seen in FIG. 6, when the frame is open at running conditions, the pins 29, 30 and 31, about which said levers 27 and 28 are rotatable and also the pins 34, 35 and 36, about which said levers 32 and 33 are rotatable, are arranged in triangle apices such that the stresses being transmitted from the wheels to the vehicle frame under running conditions, i.e. the weight of one or more passengers sitting down on seat 23, will tend to reduce the amplitude for that angle of each of the above triangles having its apex at pin 29 and pin 34, respectively. For the purpose of avoiding this, two stops 48 are secured on the main tubular structure, on which stops said levers 28 will rest for avoiding a reduction in the angle between said two levers 27 and 28 when the vehicle is running, i.e. for finally preventing said forks from collapsing within the main tubular section during the vehicle running.

An extension 49 also projects from lever 32 and bears on lever 33, again to prevent the angle between levers 32 and 33 from reducing its amplitude, or to prevent said footboard 17 from collapsing within the main tubular structure when the vehicle is running.

For a higher safety, that is to prevent said frame from moving to a closed position even when a lifting is exerted on seat 23, a locking lever 50 is provided, at one end thereof this lever being pivoted to seat 23 and at the other end having a spoke which projects and is inserted into a hole in the tube section 11. It should be noted that what is needed for allowing said seat to rotate about pins 22 is to cause said spoke of lever 50 to come out of the hole in tube section 11 and that said lever 50 is for locking the frame at collapsed position, again by said spoke fast with lever 50 engaging the hole in the tube section 11.

It will be appreciated that when seat 23 is rotated on pins 22 to be moved from the open position in FIG. 6 to the closed position in FIG. 8, the motion-transmitting means connecting said seat to levers 28 and 33 operates on said levers causing first pins 29, 30 and 31 and pins 34, 35 and 36, respectively, to be aligned to one another and then levers 27, 28 and 32, 33, respectively, to assume a reverse angle relative to that therebetween at running conditions, as readily seen when comparing the two FIGS. 6 and 7.

In the embodiment shown in FIGS. 6—9, an internal combustion engine 51 is mounted on one of said forks 14 and in a manner per se known driving one of said two wheels 15 and being supplied with fuel with a tank 52 carried on the main tubular structure.

As apparent, instead of only one steering wheel 19, on the above described frame there may be mounted two steering wheels, interconnected in any known manner by a parallelogram system, and the vehicle may be driven by pedals instead of being power driven.

The vehicle, as described, is made of a tubular structure, extremely light weighted and of a low cost of production and capable of being readily stored, under collapsed conditions as in FIG. 8, within any space or car trunk. A vehicle comprising the above frame may therefore be used as an auxiliary vehicle when failures occur in the car transporting it, or as a vehicle to be used for short ridings.

I claim:

1. A collapsible frame for a wheeled vehicle, comprising a main tubular structure, a pair of forks which at one end thereof are pivoted to the rear lower side of said tubular structure and each carrying at the other end thereof at least one wheel, a rigid footboard pivoted to the front lower side of the tubular structure and on which at least one rod is mounted, at the running conditions for the vehicle said rod being rotatable about a substantially vertical axis and carrying at an end thereof one vehicle wheel, said rod being provided with means operable to control the rotation thereof about said substantially vertical axis, the frame also comprising a secondary tubular structure pivoted to the upper side of said main tubular structure and forming the rigid portion of a seat, said pair of forks and said footboard, along with the wheels carried thereby, being rotatable on respective pins restraining them to the main tubular structure between a closed position, at which they are collapsed within the main tubular structure, and an open position, at which they project from said tubular structure with the wheels supporting the vehicle at running conditions, said secondary tubular structure being rotatable on its pins between a closed position, at which it is overturned on the main tubular structure, and an open position, at which it extends at the rear of the main tubular structure, means being provided for clamping at least said pair of forks and said footboard at said open position, each fork of said pair of forks being connected to said main tubular structure by first and second levers pivoted to one another at an end thereof and with the other end of the first lever pivoted to the fork and the other end of the second lever pivoted to the main tubular structure, said footboard is pivoted to said main tubular structure by at least one first lever and one second lever pivoted to each other at an end thereof and with the other end said first lever pivoted to said footboard and the other end of said second lever pivoted to said main tubular structure, said second lever of each fork and said second lever of the footboard being connected to said secondary tubular structure by motion-transmitting means pivotally connecting on the main tubular structure said secondary tubular structure to the footboard and the pair of forks and controlling the setting at closed position and open position, respectively, for the footboard and the pair of forks upon setting at a closed position and open position, respectively, for the secondary tubular structure on said main tubular structure.

2. A collapsible frame according to claim 1, wherein under the conditions where said secondary tubular structure, said pair of forks and said footboard are at open position, the pins, about which said first and second levers connected to the footboard are rotatable and, respectively, the pins, about which said first and second levers connected to each of said forks, are rotatable, are arranged in triangle apices such that the stresses being transmitted from the wheels to the frame when the vehicle is running, will tend to reduce the amplitude for that angle of each of said triangles to which a first and a second lever converge as adjacent each other, stop means being provided and operable on said levers for avoiding said reduction in the angle between each first lever with the second lever adjacent thereto, when said secondary tubular structure is moved from an open position to a closed position said motion-transmitting means operating on said levers first to move said pins of each said first and second lever to be aligned to one another and then to reverse the angle between said levers.

3. A collapsible frame according to claim 2, wherein said means operable to control the rotation of said rod rotatable on the footboard comprise a handle provided with fastening means to said rod, said handle being collapsed within the main tubular structure when said footboard is at a closed position.

4. A collapsible frame according to claim 3, comprising an engine or motor for driving at least one of the vehicle wheels.

5. A collapsible frame according to claim 3, comprising a locking member for said secondary tubular structure, said pair of forks and said footboard at an open position and at a closed position, respectively.